United States Patent
Fallon (10) Patent No.: US 10,849,199 B2
(45) Date of Patent: Nov. 24, 2020

(54) INDEPENDENTLY CONTROLLABLE LED ARRAY

(71) Applicant: Jarrad Bryan Fallon, Sharon, MA (US)

(72) Inventor: Jarrad Bryan Fallon, Sharon, MA (US)

(*) Notice: Subject to any disclaimer, the term of this patent is extended or adjusted under 35 U.S.C. 154(b) by 0 days.

(21) Appl. No.: 16/535,852

(22) Filed: Aug. 8, 2019

(65) Prior Publication Data

US 2020/0053853 A1 Feb. 13, 2020

Related U.S. Application Data

(60) Provisional application No. 62/716,051, filed on Aug. 8, 2018.

(51) Int. Cl.
| | |
|---|---|
| *H05B 45/20* | (2020.01) |
| *A41D 19/015* | (2006.01) |
| *F21V 33/00* | (2006.01) |
| *F21V 23/04* | (2006.01) |
| *H05B 45/22* | (2020.01) |
| *F21Y 115/10* | (2016.01) |
| *F21W 111/10* | (2006.01) |

(52) U.S. Cl.
CPC ......... *H05B 45/20* (2020.01); *A41D 19/0157* (2013.01); *F21V 23/0492* (2013.01); *F21V 33/0008* (2013.01); *H05B 45/22* (2020.01); *F21W 2111/10* (2013.01); *F21Y 2115/10* (2016.08)

(58) Field of Classification Search
CPC ..... H05B 45/20; H05B 45/22; F21V 23/0492; F21V 33/0008
See application file for complete search history.

(56) References Cited

U.S. PATENT DOCUMENTS

| | | | |
|---|---|---|---|
| 2013/0200819 A1* | 8/2013 | Valenti .................. | H05B 45/20 315/293 |
| 2018/0376561 A1* | 12/2018 | Pham ..................... | H05B 45/20 |

\* cited by examiner

*Primary Examiner* — Anne M Hines
(74) *Attorney, Agent, or Firm* — Lando & Anastasi, LLP (57) ABSTRACT

In one aspect, a gloving light includes a plurality of light emitting diodes (LEDs) arranged in an array; a programmable controller configured to store logic including instructions for controlling a functionality of the plurality of LEDs; at least one user interface for modifying the logic stored in the programmable controller; and a housing configured to enclose the electronics and be retained in a digit of a glove. In another aspect, a gloving light includes at least one LED; at least one integrated circuit configured to store logic including instructions for controlling a functionality of the at least one LED; a user interface for modifying the logic stored in the at least one integrated circuit; a housing configured to enclose at least one integrated circuit and to be inserted into a digit of a glove; and a bidirectional communication interface comprising one or more wireless emitters and receivers for bidirectional communication.

19 Claims, 6 Drawing Sheets

INDEPENDENTLY CONTROLLABLE LED ARRAY

CROSS REFERENCE TO RELATED APPLICATIONS

This application claims priority under 35 U.S.C. § 119(e) to U.S. Provisional Application Ser. No. 62/716,051, titled "INDEPENDENTLY CONTROLLABLE LED ARRAY," filed Aug. 8, 2018, which is incorporated herein by reference in its entirety.

BACKGROUND

"Gloving" refers to the act of performing a lightshow using gloves that include a light embedded or otherwise attached to one or more digits of said glove.

Previous lights used for gloving have generally employed a single basic multicolor LED pulsed on/off in various colors and various duty cycles to display trails of light when the user moves their hands. The user may be able to configure the programmable controller through a user interface to alter the colors displayed as well as the algorithm in which the LED will be pulsed on/off, but these prior approaches limit the user to a single point source of light for each module. Accordingly, these existing gloves have not allowed the user to create images within their trails of light.

Previous lights used for gloving have employed unidirectional communication between individual units, one defined as the master and other as the slave. This limits users to passing information such as colors, flashing patterns, and operational modes from one unit to another, and must first be put into a special transmission operational mode to be able to transmit or receive data.

SUMMARY

The examples disclosed herein overcome the drawbacks of existing gloves by providing independently programmable lights for use in gloves to create moving light effects. These examples also allow the user to perform a single button press action to actively transmit data between devices while performing a light show.

According to one aspect, a gloving light includes a plurality of light emitting diodes (LEDs) arranged in an array; a programmable controller configured to store logic including instructions for controlling a functionality of the plurality of LEDs; at least one user interface for modifying the logic stored in the programmable controller; and a housing configured to enclose the electronics and to be retained in a digit of a glove. In one example, the plurality of LEDs is a plurality of multicolor LEDs.

In another example, the at least one user interface includes a wireless interface. In a further example, the wireless interface includes an infrared, visible light, radio frequency, Bluetooth or similar communication interface.

In another example, the at least one user interface includes a wired communication interface. In another example, the gloving light further includes one or more buttons configured to allow a user to modify the logic stored in the programmable controller. In another example, the gloving light further includes at least one sensor configured to determine at least one of an acceleration of the gloving light, a position of the gloving light, and a motion of the gloving light.

In yet another example, the gloving light further includes at least one sensor configured to detect sound. In another example, the gloving light further includes at least one sensor configured to detect light. In still another example, the gloving light further includes at least one sensor configured to detect physical orientation.

According to another aspect, a gloving light with wireless bidirectional communication includes at least one light emitting diode (LED); at least one integrated circuit configured to store logic including instructions for controlling a functionality of the at least one LED; a user interface for modifying the logic stored in the at least one integrated circuit; a housing configured to enclose at least one integrated circuit and to be inserted into a digit of a glove; and a bidirectional communication interface comprising one or more wireless emitters and receivers for bidirectional communication.

According to one example, the bidirectional communication interface includes one or more visible light emitter/receiver interfaces. According to yet another example, the bidirectional communication interface includes one or more infrared emitter/receiver interfaces. According to still another example, the bidirectional communication interface includes at least one of a radio frequency interface and a Bluetooth interface.

According to another example, the bidirectional communication interface is configured to transfer data with at least one other gloving light, and wherein at least one integrated circuit is configured to modify an operational mode of the at least one LED based on at least one transmission of data received from the at least one other gloving light and input received from the user interface. According to yet another example, the bidirectional communication interface is configured to transfer data with at least one other gloving light, and wherein the at least one integrated circuit is configured to transmit at least one instruction to change an operational mode of the at least one other gloving light. According to another example, the gloving light further includes a motion detector configured to detect motion, and the integrated circuit is configured to change an operational mode of the gloving light to an inactive or powered-off status based on a lack of detected motion by the motion detector for a predefined period of time.

According to another example, the gloving further includes a physical communication port configured to receive other logic for the integrated circuit. According to a further example, the integrated circuit is configured to update the logic stored in the integrated circuit with the other logic received via the physical communication port.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example.

The appearances of such terms herein are not necessarily all referring to the same example.

DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

The present examples overcome drawbacks of previous gloving lights by providing independently programmable lights that can be used in gloves to create moving light effects. Each independently programmable light of the present invention comprises a plurality of light emitting diodes (or LEDs) generally arranged in an array, a programmable controller that stores logic for controlling the array of LEDs and can interface with various sensors, integrated circuits and user interface modules. Each element in the LED array can be controlled independently by the programmable controller. Each programmable controller can be configured to pulse each element of the array of LEDs on/off and modify the colors displayed according to algorithms defined by logic on each programmable controller. When elements in the array of LEDs are pulsed on/off and motion is added it creates images in trails of light due to persistence of vision. These light trails create images in their path of motion based on the timing of colors and on/off time of each element in the LED array. The user can modify the logic within the programmable controller to customize the functionality of the light. Modifications to the logic within the programmable controller can be made by interfacing with external control units. Sensors, LEDs and various integrated circuits enable bidirectional communication between devices.

Figure 6:
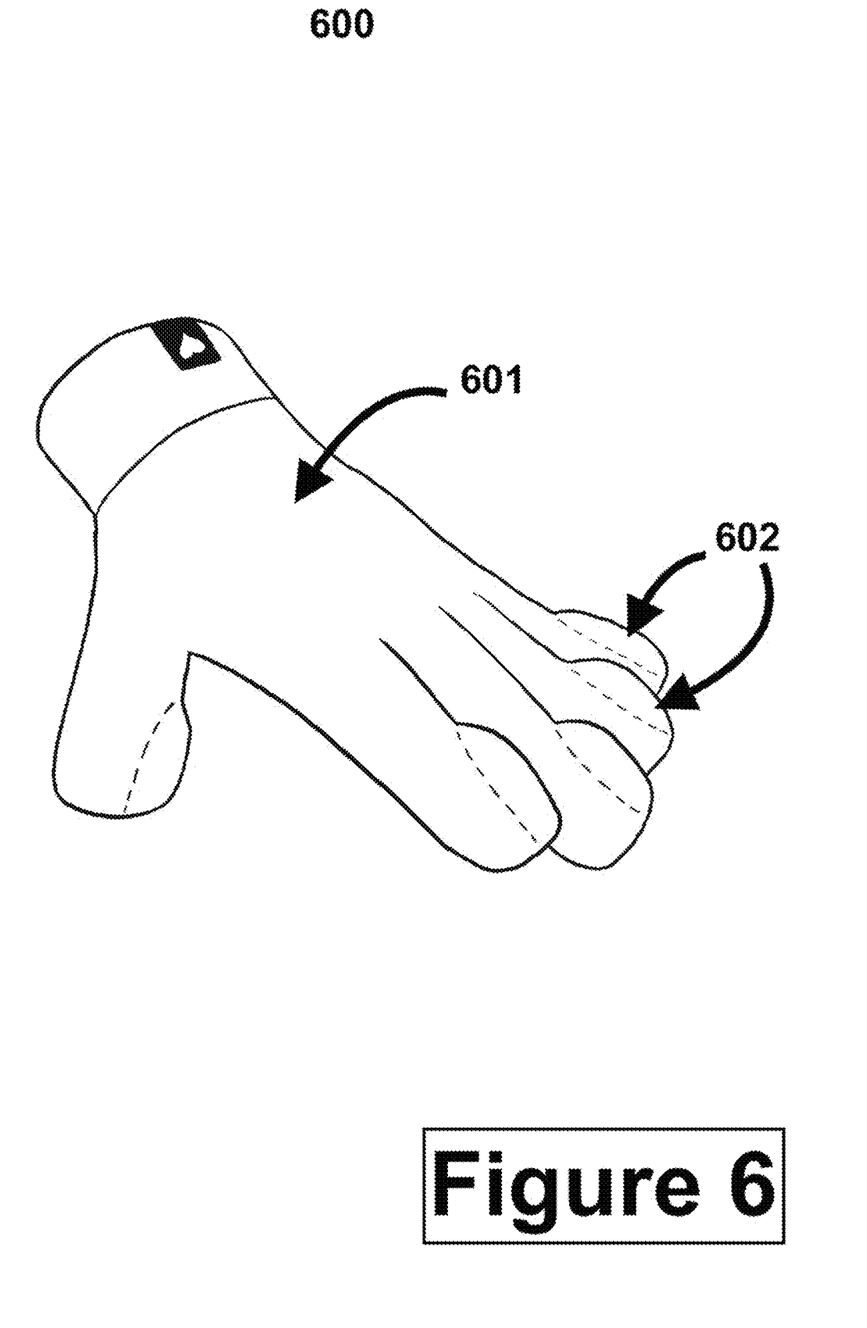
FIG. 6 illustrates an exemplary glove in which the programmable lights of the present invention could be used.

FIG. 6 illustrates an exemplary glove 601 that can be used for gloving. As shown, glove 601 includes a plurality lights 602 at the tips of respective digits of the glove 601. Often, a user will wear a glove 601 on one or both hands, and move their hands with the beat of music to perform a lightshow.

Figure 1:
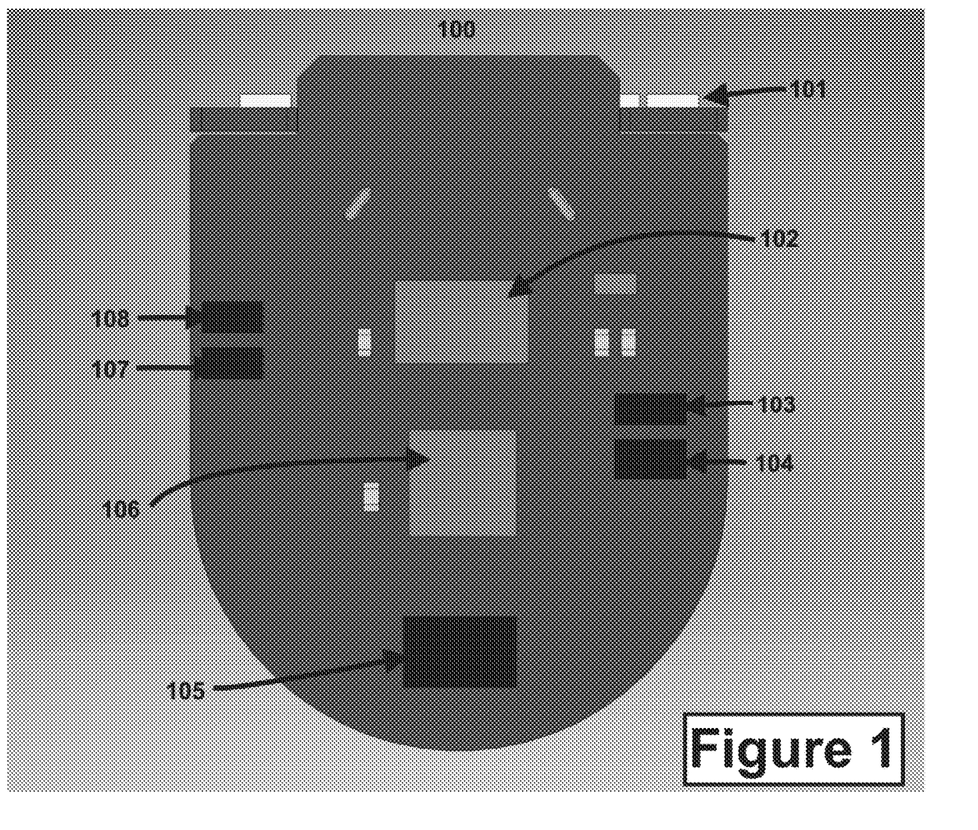
FIG. 1 illustrates a top down view of an exemplary programmable light.
Figure 2:
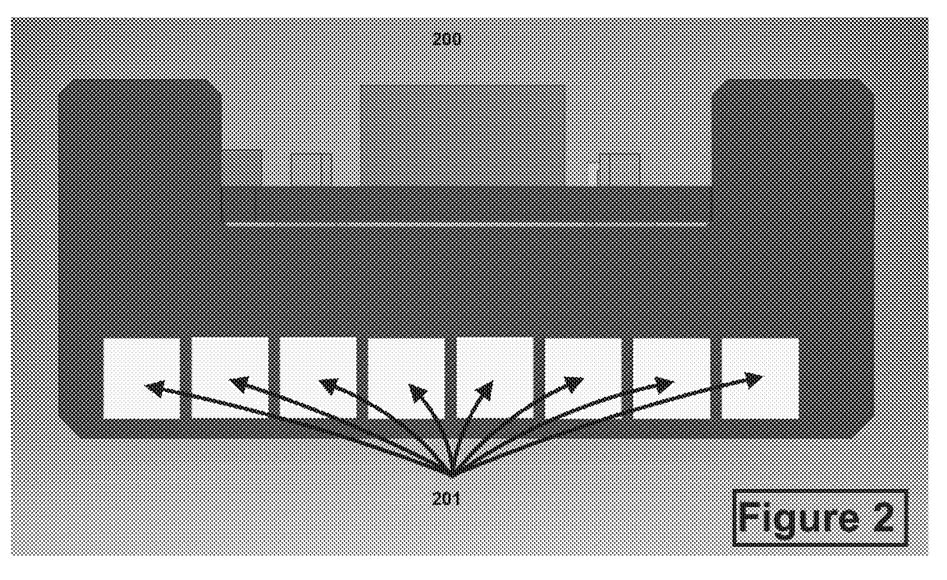
FIG. 2 illustrates a front view of an exemplary programmable light with an array of LEDs.

FIG. 1 shows an independently programmable light (e.g., light 602) according to some examples. As seen in FIG. 1, each independently programmable light 100 of the present invention comprises a plurality of light emitting diodes 101 (or LEDs) arranged in an array 201 as seen in FIG. 2.

Returning to FIG. 1, the light 101 also includes a user interface button 102, a transmitter 103, a receiver 104, a sensor 105, a microcontroller 106, a transmitter 107, and a receiver 108. These components are shown separately here for ease of illustration only, and may be combined based on their functionality. For example, the transmitter 107 and the receiver 108 may be combined into a single interface module in some examples.

Figure 3:
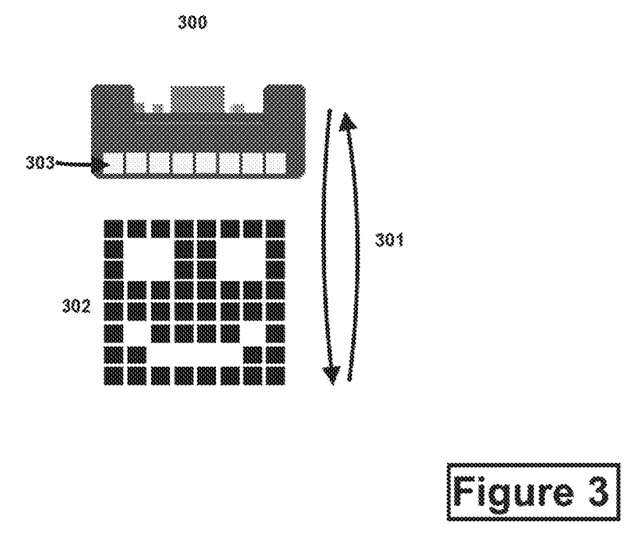
FIG. 3 illustrates a front view of an exemplary programmable light in motion and an embodiment of a light trail created by the array of LEDs.

The microcontroller 106 stores logic for controlling the array of LEDs. The microcontroller 106 can interface with various sensors (e.g., sensor 105), integrated circuits, and user interfaces, and modify its logic and outputs accordingly. Each element in the LED array can be controlled independently by the microcontroller 106. For example, the microcontroller 106 can be configured to pulse each element of the array of LEDs 201 on/off and modify the colors displayed according to algorithms defined by logic on each programmable controller. When the array of LEDs 201 is pulsed on/off and motion 301 is added it creates images 302 in trails of light due to a phenomenon known as persistence of vision.

FIG. 3 depicts such an image 302 presented to a user by a trail light due to persistence of vision. The image 302 is created by selectively pulsing the array of LEDs 303.

The logic controlling the pulsing of the array of LEDs 201 may include instructions that cause each LED in the array of LEDs to pulse based on predefined timing parameters. The logic may include instructions that cause each LED to change color based on time, motion or algorithmic permutations. The timing parameters and colors displayed may be modified based on movement.

For example, if the user is moving quickly the image 302 will appear stretched, conversely if the user is moving slowly the image 302 will appear condensed. Using data obtained from a motion sensor 105, the microcontroller 106 can calculate the users speed and adjust the on/off timing parameters of the LED's so the image 302 displayed by the light trail is visually proportional regardless of the user's speed. The speed data may also be used to alter the colors displayed by each LED. For example, at low speeds an image 302 may appear red, at high speeds an image 302 may appear blue, and at medium speeds an image may appear a gradient of red to blue varying based on speed of motion.

Figure 4:
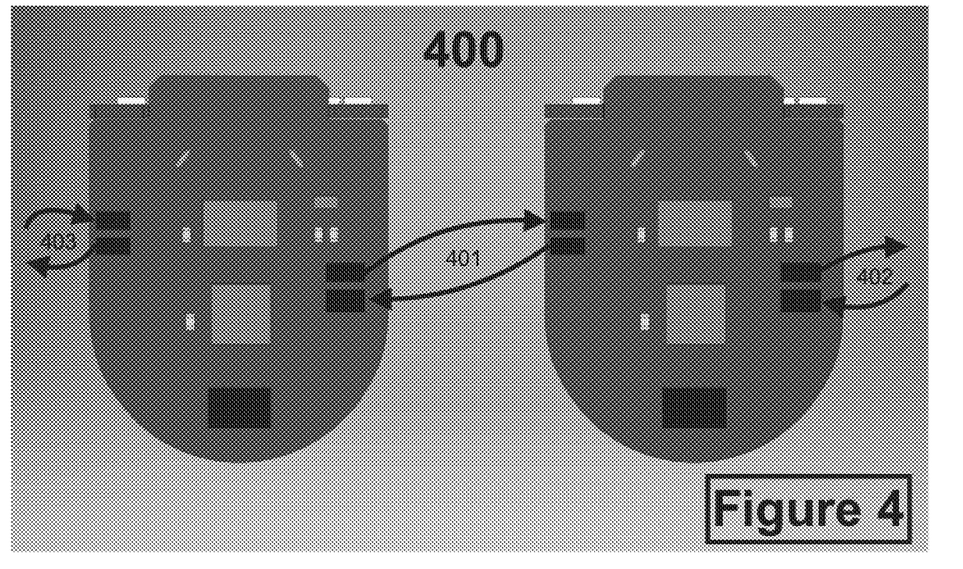
FIG. 4 illustrates a top down view of multiple programmable lights and depicts an embodiment of bidirectional communication between individual lights.

The light trails create images 302 in their path of motion based on the timing on/off time and color of each element in the LED array. The user can modify the logic within the microcontroller 106 to customize the functionality of the array of LEDs 201. Modifications to the logic within the microcontroller 106 can be made by interfacing with external control units 400. Sensors. LEDs and various integrated circuits enable bidirectional communication with these units 400.

For example, at time t=0, all of the LEDs in the array are on, creating the solid top of row of image 302.

At t=1, the LEDs at positions 2, 3, 6, and 7 are turned off to create the second row of the image 302.

At t=2, the LEDs at positions 2, 3, 6, and 7 are turned off to create the third row of the image 302.

At t=3, all of the LEDs in the array are on, creating the solid fourth row of the image 302.

At t=4, all of the LEDs in the array are on, creating the solid fifth row of the image 302.

At t=5, the LEDs at positions 2 and 7 are turned off to create the sixth row of the image 302.

At t=6, the LEDs at positions 3, 4, 5, and 6 are turned off to create the seventh row of the image 302.

At t=7, all of the LEDs in the array are on, creating the solid eighth row of the image 302.

FIG. 4 illustrates a bidirectional communication between individual lights within respective arrays of LEDs, including array of LEDs 201. For example, bidirectional communication links 401, 402, 403 may be established between individual lights in different arrays of LEDs. The bidirectional communication links between devices allows the user to change the operational mode of any number of devices with a single point of user interface, such as a button click. Bidirectional communication enables the user to daisy chain their lights to create effects synchronously across any number of units.

As seen in FIG. 2, in one embodiment a gloving light comprises an array of 1×8 multicolor LEDs 201 (8 defines the pixel width of the light images to be rendered and can be any number). When elements of the array of LEDs 201 are pulsed on/off and motion is added, the light creates light trail images 302 of 8 pixels×N pixels, where in is an arbitrary length defined by the image size and the degree of movement of the light.

Gloving light 100 can have wireless emitters and receivers that interface with said programmable controller to enable bidirectional data communication between devices. Said gloving light 100 can have sensors that interface with said programmable controller to measure motion, acceleration, orientation, sound and light, and alter the operational mode according to the data received. Said gloving light 100 can connect with external units through wired or wireless means to update the stored logic on said programmable controller. For example, bidirectional communication enables the user to store separate memory banks of colors and flashing patterns on each individual light inside their gloves; a single button click on a light configured to emit the color blue can transmit a signal to configure all lights that share the same channel to the same blue configuration. Additionally, another light on another channel configured to emit the color red can transmit a signal to alter the output of lights on that same channel. Additionally, another light configured to emit a specified strobe pattern can transmit a signal to alter the output of lights on the same channel. Similarly, a single button click can turn any lights within range on or off, allowing the user to switch between configurations with 1 action as opposed to previous gloving lights require 10 actions (one button click per light on each of 10 digits). Similarly, a single button click can initiate the bidirectional communication protocol and synchronize colors, patterns and timing across any number of units, allowing the user to display images that are the full length of the array of LEDs rather than being limited to the length of an individual segment.

In one embodiment, a gloving light comprises an array of one or more LEDs 201, one or more programmable controllers storing logic for controlling the functionality of the array of LEDs, one or more user interface for modifying the logic stored in the programmable controller, and wireless emitter/receiver to enable bidirectional data communication between gloving lights. Bidirectional communication enables the user to transmit settings from one light to a one or more other lights allowing synchronizing of colors, patterns, algorithms, operational modes, timing, button functions and any logic associated with the functionality of the lights. The user is able to select the channel of transmission to enable selective synchronization between gloving lights, allowing the user to prevent their gloving lights from interfering with other users' lights with bidirectional communication. This also allows a light to receive a signal, perform actions, and then echo the message through its transmitter allowing data to be passed to all lights with a single user interface action regardless of channel.

Bidirectional communication allows the user to perform a user interface action (such as a button click) on one gloving light to produce an effect on one or more light units. In one embodiment, a user can turn on/off any individual light and it will transmit a signal to turn on/off any lights on the same channel. These signals can be encoded with time signatures to allow the receiving lights to synchronize their operational modes based on time, this is particularly useful when the colors/patterns displayed by said light have time-based permutations. Similarly, the user can press a button to change the operational mode of one light to alter the color and pulsing frequency of the light emitted by the LEDs. Through bidirectional communication, this change in color and pulsing frequency data can be sent to any number of compatible LED devices allowing said devices to synchronize their light output with any units. These changes may be saved to the microcontrollers memory to be stored for later use or may be held temporarily to affect a change that can revert to its original function.

In one embodiment, a gloving light comprises a microcontroller for storing application specific logic, a user interface (such as a button) and one or more LED's. Based on the stored logic, the user can alter the functionality of the gloving light with the press of a button. One example of this is as follows: The user can press the button to turn on the gloving light, while on the user can choose between a short press of the button and a long hold of the button, each choice produces different results. In this example, a short press will alter the color and/or frequency of on/off time displayed by the LEDs to the specifications pre-set by the configurable logic, whereas a long press will enter a configuration menu where the user is able to reconfigure the LEDs to display any combination of color and/or frequency of on/off time displayed by the LEDs and overwrite the previous logic and save these changes to memory. This is particularly useful when the user desires to change the effects based on their speed of motion and specific dance styles. In another example, the stored logic can be configured through the user interface to enable/disable sensors (such as an accelerometer) to enable/disable motion reactivity. An example of enabling motion reactivity is at slow speeds the LEDs emit the color pink at 50 Hz frequency with an on/off period of 20 milliseconds and at high speeds the LEDs emit the color blue at 25 Hz frequency with an on/off period of 40 milliseconds. An example of disabling motion reactivity with the same color and frequency settings would yield an alternating pink 20 milliseconds on/off pulse and 40 milliseconds blue on/off pulse. These changes can be useful for demonstrating specific speed control and accentuating any motion related dance styles of the user's performance.

Figure 5:
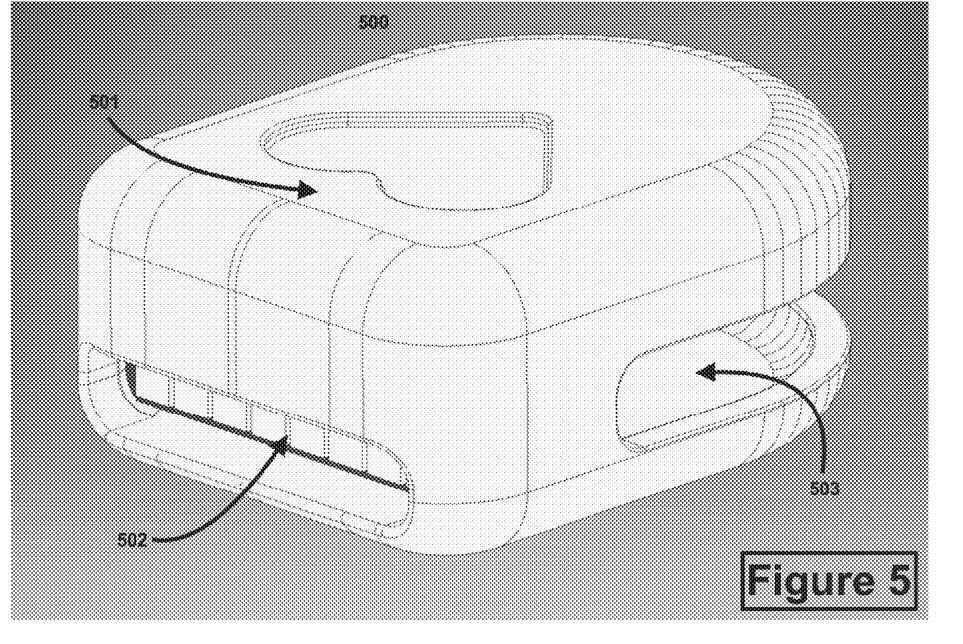
FIG. 5 illustrates a perspective view of an exemplary programmable light inside of a casing designed to enclose said programmable light.

FIG. 5 illustrates an exemplary programmable light inside of a casing 501 designed to enclose said programmable light. In one embodiment, a gloving light comprises an array 502 of one or more LEDs. In other examples, the gloving light can be configured to fit in an alternate housing and used as the light source for other LED based dance props such as orbitals, orbits, poi, hoops, staff, swords and lightsabers. For example, orbitals can contain any number of gloving lights, and generally spin said lights about an axis propelled by the oscillatory action of pulling and releasing a wound string to create tension which rotates said orbital about its axis.

In one embodiment, a gloving light comprises one or more LEDs and a light sensor. This light sensor can be configured to receive data transmitted from any light source. One example is using the LED on a smartphone/tablet as a transmitter and said light sensor as a receiver. In this embodiment, the user can interface with a program or application running on said smartphone, configure said smartphone to transmit data using its LED to configure operational modes of said gloving light.

In one embodiment, a gloving light comprises one or more LEDs, a programmable controller and an interface to support a wired connection to an external device such as a computer, tablet, phone, watch, pendant or similar application specific control device. Through said wired connection the user can modify any existing logic stored on said programmable controller. Through said wired connection the user can install entirely new logic to be stored on said programmable controller. For example, the user can modify the pattern library to change the rate and pattern at which the LEDs are pulsed on/off. Similarly, the user can modify the color library to change the colors emitted by said LEDs. Similarly, the user can modify the button control logic to alter how the programmable controller responds to user input. Similarly, the user can modify the logic for interfacing with sensors and communication modules.

In one embodiment, a gloving light comprises one or more LEDs, a programmable controller and an interface to support a wireless connection to an external device such as a computer, tablet, phone, watch, pendant or similar application specific control device. Through said wireless connection the user can modify any existing logic stored on said programmable controller. Through said wireless connection the user can install entirely new logic to be stored on said programmable controller. For example, the user can modify the pattern library to change the rate and pattern at which the LEDs are pulsed on/off. Similarly, the user can modify the color library to change the colors emitted by said LEDs. Similarly, the user can modify the button control logic to alter how the programmable controller responds to user input. Similarly, the user can modify the logic for interfacing with sensors and communication modules.

In one embodiment, a gloving light comprises an array of one or more LEDs, one or more programmable controllers storing logic for controlling the functionality of the array of LEDs, one or more user interface for modifying the logic stored in the programmable controller, and an integrated circuit to measure and detect movement, orientation and/or acceleration. The programmable controller communicates with the motion detection integrated circuit to determine the speed at which the user is moving and alter the colors and patterns displayed by the LED accordingly. For example, when motion is sensed, the logic can alter the colors and/or patterns displayed. This also enables the controller to determine if the gloving light is inactive, and initiate a shutdown sequence to preserve battery life. Additionally, if this shutdown sequence is executed, the gloving light is put into lock mode where a long hold or specific press sequence of the user interface button is required to turn the gloving light on again, this is to prevent accidental button presses which would normally enable the light and continue to drain power.

Example Computer Implementations

Processes described above are merely illustrative embodiments of systems that may be used to implement gloving lights. Such illustrative embodiments are not intended to limit the scope of the present disclosure, as any of numerous other implementations exist for performing the disclosure. None of the claims set forth below are intended to be limited to any particular implementation, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C #, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present disclosure discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present disclosure.

Various embodiments according to the disclosure may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate extending offers to users and redeeming offers according to various embodiments of the disclosure. Further, the software design system may be located on a single computer or may be distributed among a plurality of computers attached by a communications network.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, Linux, MAC OS X Snow Leopard, MAC OS X Lion operating systems available from Apple Computer, the Solaris Operating System available from Oracle Corporation, iOS, Blackberry OS, Windows 7 Mobile or Android OS operating systems, or UNIX available from various sources. Many other operating systems may be used.

Some aspects of the disclosure may be implemented as distributed application components that may be executed on a number of different types of systems coupled over a computer network. Some components may be located and executed on mobile devices, servers, tablets, or other system types. Other components of a distributed system may also be used, such as databases or other component types.

The processor and operating system together define a computer platform for which application programs in high-level programming languages are written. It should be understood that the disclosure is not limited to a particular computer system platform, processor, operating system, or network. Further, it should be appreciated that multiple computer platform types may be used in a distributed computer system that implement various aspects of the present disclosure. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). Certain aspects of the present disclosure may also be implemented on a cloud-based computer system (e.g., the EC2 cloud-based computing platform provided by Amazon.com), a distributed computer network including clients and servers, or any combination of systems.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 7:
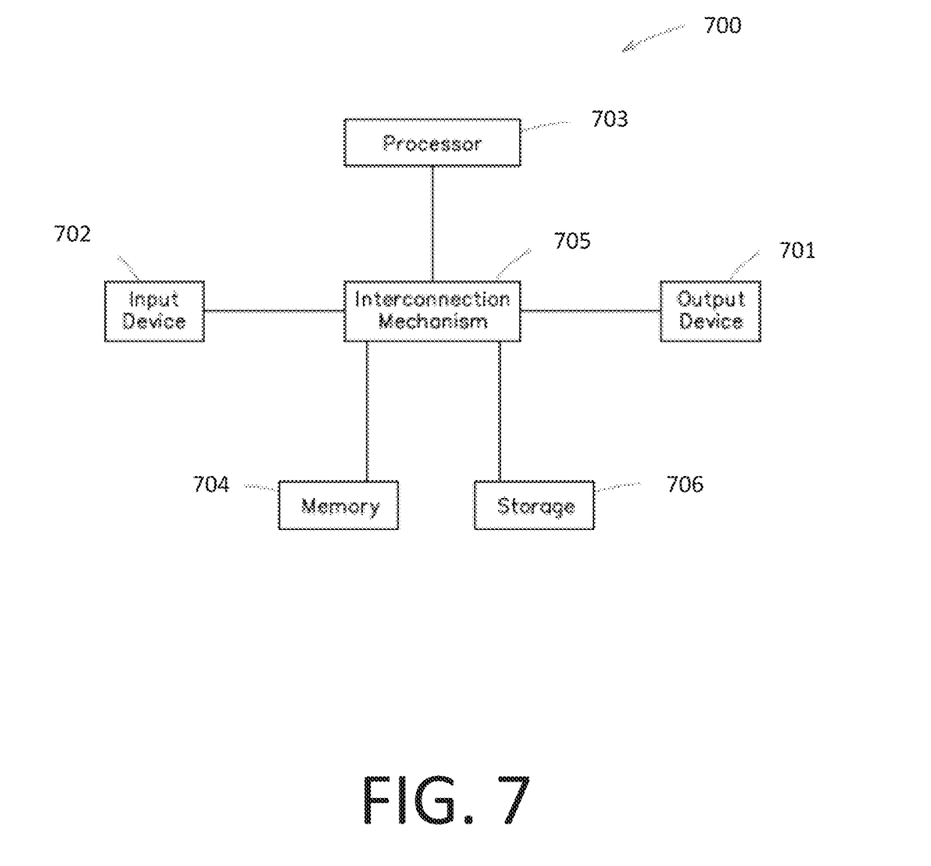
FIG. 7 is a block diagram of one example of a computer system on which aspects and embodiments of the present disclosure may be implemented.
Figure 8:
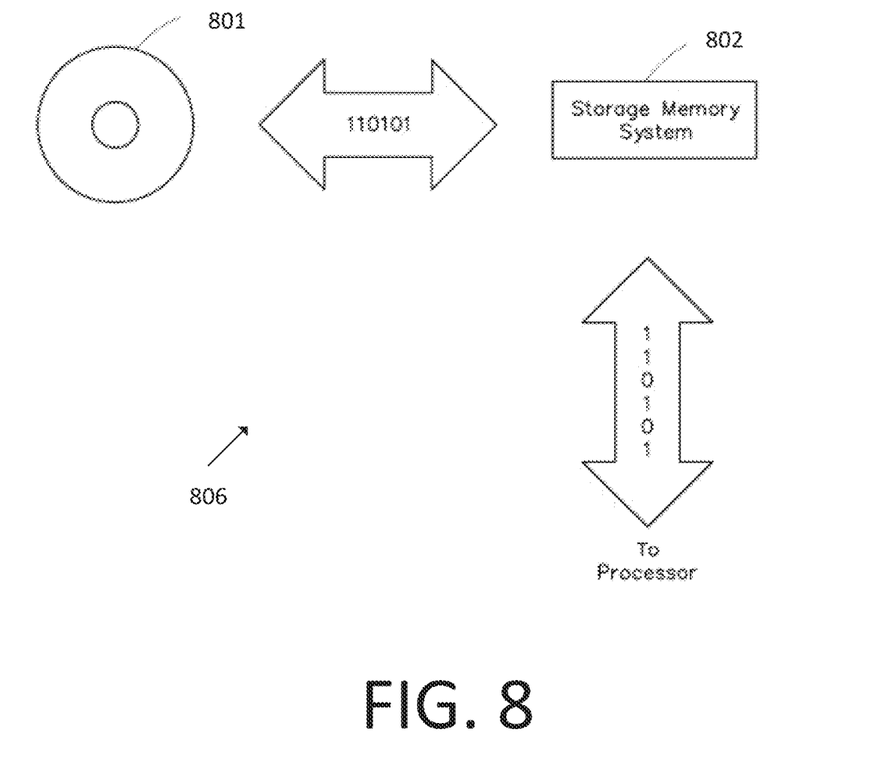
FIG. 8 shows an example storage system capable of implementing various aspects of the present disclosure.

The presently disclosed systems and methods may be implemented on a computer system described below in relation to FIG. 7. In particular, FIG. 7 shows an example computer system 700 used to implement various aspects. FIG. 8 shows an example storage system that may be used.

System 700 is merely an illustrative embodiment of a computer system suitable for implementing various aspects of the disclosure. Such an illustrative embodiment is not intended to limit the scope of the disclosure, as any of numerous other implementations of the system, for example, are possible and are intended to fall within the scope of the disclosure. For example, a virtual computing platform may be used. None of the claims set forth below are intended to be limited to any particular implementation of the system unless such claim includes a limitation explicitly reciting a particular implementation.

Various embodiments according to the disclosure may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments of the disclosure. Further, the software design system may be located on a single computer or may be distributed among a plurality of computers attached by a communications network.

For example, various aspects of the disclosure may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 75 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, and/or speaker. In addition, computer system 700 may contain one or more interfaces (not shown) that connect computer system 700 to a communication network (in addition or as an alternative to the interconnection mechanism 705).

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random-access memory (DRAM) or static memory (SRAM). It may be located in storage system 806, as shown, or in memory system 804, not shown. The processor 803 generally manipulates the data within the integrated circuit memory 804, 802 and then copies the data to the medium 801 after processing is completed. A variety of mechanisms are known for managing data movement between the medium 801 and the integrated circuit memory element 802, and the disclosure is not limited thereto. The disclosure is not limited to a particular memory system 704 or storage system 706.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the disclosure may be practiced, it should be appreciated that aspects of the disclosure are not limited to being implemented on the computer system as shown in FIG. 7. Various aspects of the disclosure may be practiced on one or more computers having a different architecture or components that that shown in FIG. 7.

Computer system 700 may be a general-purpose computer system that is programmable using a high-level computer programming language. Computer system 700 may be also implemented using specially programmed, special purpose hardware. In computer system 700, processor 703 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP).

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented using various Internet technologies such as, for example, the well-known Common Gateway Interface (CGI) script, PHP Hyper-text Preprocessor (PHP), Active Server Pages (ASP), Hypeffext Markup Language (HTML), Extensible Markup Language (XML), Java, JavaScript, Asynchronous JavaScript and XML (AJAX), Flash, and other programming methods. Further, various aspects of the present disclosure may be implemented in a cloud-based computing platform, such as the well-known EC2 platform available commercially from Amazon.com (Seattle, Wash.), among others. Various aspects of the disclosure may be implemented as programmed or non-programmed elements, or any combination thereof.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A gloving light with wireless bidirectional communication, each light comprising:

At least one light emitting diode (LED);

at least one integrated circuit configured to store logic including instructions for controlling a functionality of the at least one LED;

a user interface for modifying the logic stored in the at least one integrated circuit;

a housing configured to enclose at least one integrated circuit and to be inserted into a digit of a glove; and a bidirectional communication interface comprising one or more wireless emitters and receivers for bidirectional communication, wherein the bidirectional communication interface is configured to transfer data with at least one other gloving light; and wherein the at least one integrated circuit is configured to modify an operational mode of the at least one LED based on at least one transmission of data received from the at least one other gloving light and input received from the user interface.

2. The gloving light of claim 1, wherein the bidirectional communication interface comprises one or more visible light emitter/receiver interfaces.

3. The gloving light of claim 1, wherein the bidirectional communication interface comprises one or more infrared emitter/receiver interfaces.

4. The gloving light of claim 1, wherein the bidirectional communication interface comprises at least one of a radio frequency interface and a Bluetooth interface.

5. The gloving light of claim 1, wherein the bidirectional communication interface is configured to transfer data with at least one other gloving light, and wherein the at least one integrated circuit is configured to transmit at least one instruction to change an operational mode of the at least one other gloving light.

6. The gloving light of claim 1, further comprising a motion detector configured to detect motion, and wherein the integrated circuit is configured to change an operational mode of the gloving light to an inactive or powered-off status based on a lack of detected motion by the motion detector for a predefined period of time.

7. The gloving light of claim 1, further comprising a physical communication port configured to receive other logic for the integrated circuit.

8. The gloving light of claim 7, wherein the integrated circuit is configured to update the logic stored in the integrated circuit with the other logic received via the physical communication port.

9. The gloving light of claim 1, wherein the at least one LED is at least one multicolor LED.

10. The gloving light of claim 1, wherein the user interface comprises a wireless interface.

11. The gloving light of claim 10, wherein the wireless interface comprises an infrared, visible light, radio frequency, Bluetooth or similar communication interface.

12. The gloving light of claim 1, further comprising one or more buttons configured to allow a user to modify the logic stored in the at least one integrated circuit.

13. The gloving light of claim 1, further comprising at least one sensor configured to determine at least one of an acceleration of the gloving light, a position of the gloving light, a motion of the gloving light, and a physical orientation of the gloving light.

14. The gloving light of claim 1, further comprising at least one sensor configured to detect sound.

15. The gloving light of claim 1, further comprising at least one sensor configured to detect light.

16. A gloving light with wireless bidirectional communication, each light comprising:

At least one light emitting diode (LED);

at least one integrated circuit configured to store logic including instructions for controlling a functionality of the at least one LED;

a user interface for modifying the logic stored in the at least one integrated circuit;

a housing configured to enclose at least one integrated circuit and to be inserted into a digit of a glove; and a bidirectional communication interface comprising one or more wireless emitters and receivers for bidirectional communication; and wherein the bidirectional communication interface is configured to transfer data with at least one other gloving light, and wherein the at least one integrated circuit is configured to transmit at least one instruction to change an operational mode of the at least one other gloving light.

17. The gloving light of claim 16, wherein the bidirectional communication interface is configured to transfer data with at least one other gloving light, and wherein the at least one integrated circuit is configured to transmit at least one instruction to change an operational mode of the at least one other gloving light.

18. The gloving light of claim 16, further comprising a motion detector configured to detect motion, and wherein the integrated circuit is configured to change an operational mode of the gloving light to an inactive or powered-off status based on a lack of detected motion by the motion detector for a predefined period of time.

19. The gloving light of claim 16, further comprising a physical communication port configured to receive other logic for the integrated circuit.

* * * * *